(12) United States Patent
Sasahara et al.

(10) Patent No.: US 9,354,320 B2
(45) Date of Patent: May 31, 2016

(54) METHOD OF DETERMINING ADEQUACY AND ADEQUACY DETERMINING DEVICE

(75) Inventors: Hideo Sasahara, Matsumoto (JP); Mikio Nagahara, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 930 days.

(21) Appl. No.: 13/329,153

(22) Filed: Dec. 16, 2011

(65) Prior Publication Data

US 2012/0154205 A1    Jun. 21, 2012

(30) Foreign Application Priority Data

Dec. 17, 2010   (JP) ................. 2010-281337

(51) Int. Cl.
*G01S 19/21* (2010.01)
*G01S 19/28* (2010.01)
*G01S 19/24* (2010.01)

(52) U.S. Cl.
CPC ............. *G01S 19/21* (2013.01); *G01S 19/243* (2013.01); *G01S 19/28* (2013.01)

(58) Field of Classification Search
CPC .................................. G01S 19/21; G01S 19/28
USPC .................................................... 342/357.45
See application file for complete search history.

(56) References Cited

U.S. PATENT DOCUMENTS

| | | | |
|---|---|---|---|
| 5,430,657 A | 7/1995 | Kyrtsos | |
| 5,486,834 A * | 1/1996 | Lennen | 342/357.76 |
| 6,313,786 B1 * | 11/2001 | Sheynblat et al. | 342/357.23 |
| 6,683,564 B1 * | 1/2004 | McBurney | G01S 19/25 |
| | | | 342/357.62 |
| 2002/0075182 A1 * | 6/2002 | Sheynblat | 342/357.02 |
| 2005/0212700 A1 * | 9/2005 | Diggelen et al. | 342/357.06 |
| 2009/0002231 A1 * | 1/2009 | Xie et al. | 342/357.13 |
| 2010/0176990 A1 * | 7/2010 | Green et al. | 342/357.12 |
| 2010/0198512 A1 * | 8/2010 | Zhang et al. | 701/226 |
| 2015/0009065 A1 * | 1/2015 | Rao | 342/357.25 |

FOREIGN PATENT DOCUMENTS

| | | |
|---|---|---|
| JP | 06-201812 A | 7/1994 |
| JP | 11-118900 A | 4/1999 |
| JP | 2003-084055 A | 3/2003 |
| JP | 3749681 B2 | 12/2005 |
| JP | 2010-197189 A | 9/2010 |

OTHER PUBLICATIONS

GPS Tutorial, Geodetic Software Solutions Ltd., 1998.*
Gleason, S. et al., *GNSS Applications and Methods*, 2009, p. 297, Artech House, Norwood, MA.

* cited by examiner

*Primary Examiner* — Tashiana Adams
*Assistant Examiner* — Fred H Mull
(74) *Attorney, Agent, or Firm* — Kilpatrick Townsend & Stockton LLP

(57) ABSTRACT

A method of determining adequacy of acquisition includes: attempting to acquire a satellite signal from a satellite and decoding first satellite orbit data; and determining the adequacy of acquisition of the satellite signal by using the first satellite orbit data and second satellite orbit data that has been acquired from the satellite.

7 Claims, 12 Drawing Sheets

| APPROXIMATION CONDITION NO. | CONTENT |
|---|---|
| A | RATIO OF SATELLITE ORBIT PARAMETERS OF WHICH VALUES ARE CLOSE > $\theta_p$ [%] |
| B | SUM OF DIFFERENCES BETWEEN VALUES OF SATELLITE ORBIT PARAMETERS < $\theta_{total}$ |
| C | DIFFERENCE BETWEEN MEAN ANOMALIES AT REFERENCE TIME "$M_0$" < $\theta_M$ |
| D | DIFFERENCE BETWEEN MEAN ANOMALIES AT REFERENCE TIME $M_0$ < $\theta_M$ AND DIFFERENCE BETWEEN LONGITUDES OF ASCENDING NODES OF ORBIT PLANE AT WEEKLY EPOCH $\Omega_0$ < $\theta_\Omega$ |
| E | DIFFERENCE BETWEEN MEAN ANOMALIES AT REFERENCE TIME $M_0$ < $\theta_M$ AND DIFFERENCE BETWEEN ARGUMENTS OF PERIGEE $\omega$ < $\theta_\omega$ |
| ⋮ | ⋮ |

FIG. 2

| APPROXIMATION CONDITION NO. | CONTENT |
|---|---|
| A | RATIO OF SATELLITE ORBIT PARAMETERS OF WHICH VALUES ARE CLOSE > $\theta_p$ [%] |
| B | SUM OF DIFFERENCES BETWEEN VALUES OF SATELLITE ORBIT PARAMETERS < $\theta_{total}$ |
| C | DIFFERENCE BETWEEN MEAN ANOMALIES AT REFERENCE TIME "$M_0$" < $\theta_M$ |
| D | DIFFERENCE BETWEEN MEAN ANOMALIES AT REFERENCE TIME $M_0$ < $\theta_M$ AND DIFFERENCE BETWEEN LONGITUDES OF ASCENDING NODES OF ORBIT PLANE AT WEEKLY EPOCH $\Omega_0$ < $\theta_\Omega$ |
| E | DIFFERENCE BETWEEN MEAN ANOMALIES AT REFERENCE TIME $M_0$ < $\theta_M$ AND DIFFERENCE BETWEEN ARGUMENTS OF PERIGEE $\omega$ < $\theta_\omega$ |
| F | DIFFERENCE BETWEEN FIRST SATELLITE POSITION AND SECOND SATELLITE POSITION < $\theta_d$ |
| G | MATCHING RATIO OF BIT VALUES > $\theta_b$ [%] |
| ⋮ | ⋮ |

FIG.10

| COLLATION SATELLITE ORBIT DATA / APPROXIMATION CONDITION NO. | ALMANAC | LONG-TERM EPHEMERIS | EPHEMERIS |
|---|---|---|---|
| A | $\theta_p 1$ | $\theta_p 2$ | $\theta_p 3$ |
| B | $\theta_{total}1$ | $\theta_{total}2$ | $\theta_{total}3$ |
| C | $\theta_M 1$ | $\theta_M 2$ | $\theta_M 3$ |
| D | [$\theta_M 1, \theta_Q 1$] | [$\theta_M 2, \theta_Q 2$] | [$\theta_M 3, \theta_Q 3$] |
| E | [$\theta_M 1, \theta_\omega 1$] | [$\theta_M 2, \theta_\omega 2$] | [$\theta_M 3, \theta_\omega 3$] |
| F | $\theta_d 1$ | $\theta_d 2$ | $\theta_d 3$ |
| G | $\theta_b 1$ | $\theta_b 2$ | $\theta_b 3$ |
| ... | ... | ... | ... |

PREDICTION ACCURACY OF SATELLITE ORBIT: LOW ↔ HIGH

HERE
$\theta_p 1 < \theta_p 2 < \theta_p 3$
$\theta_{total}1 > \theta_{total}2 > \theta_{total}3$
$\theta_M 1 > \theta_M 2 > \theta_M 3$
$\theta_Q 1 > \theta_Q 2 > \theta_Q 3$
$\theta_\omega 1 > \theta_\omega 2 > \theta_\omega 3$
$\theta_d 1 > \theta_d 2 > \theta_d 3$
$\theta_b 1 < \theta_b 2 < \theta_b 3$

METHOD OF DETERMINING ADEQUACY AND ADEQUACY DETERMINING DEVICE

This application claims priority to Japanese Patent Application No. 2010-281337, filed Dec. 17, 2010, the entirety of which is hereby incorporated by reference.

BACKGROUND

1. Technical Field

The present invention relates to a method of determining the adequacy of acquisition of a satellite signal and the like.

2. Related Art

As one type of positioning system using a positioning signal, GPSs (Global Positioning Systems) are widely known and are used in receiver devices built in cellular phones, car navigation equipment, and the like. In the GPS, a position calculating process is performed in which the coordinates of the position and the clock error of the receiver device are acquired based on information of the positions of a plurality of GPS satellites, pseudo distance from each GPS satellite to the receiver device, and the like.

A GPS satellite signal that is transmitted from a GPS satellite is modulated with a spread code that is called a C/A (Coarse and Acquisition) code and is different for each GPS satellite. The C/A code is a pseudo random noise code, in which a code length of a 1023 chip is set as 1 PN frame, having a repetition period of 1 ms. In order to acquire a GPS satellite signal from among weak reception signals, the receiver device calculates the correlation between a reception signal and a replica C/A code that is a pseudo C/A code generated inside the receiver device and acquires a GPS satellite signal based on a resultant correlation value that is acquired.

Since the C/A code is a so-called gold code, a high correlation value is not acquired unless a correlation with a replica C/A code of a correct GPS satellite signal is calculated. However, the overall magnitude of the acquired correlation value may vary depending on the reception status of a GPS satellite signal. Accordingly, for example, in a case where the signal strength of the reception signal is high or the like, even when a correlation with an incorrect satellite replica C/A code is calculated, a correlation value that is equal to or larger than a predetermined value is acquired, whereby there is a case where the correlation is determined to be acquired. Such a case is a cross correlation.

In the description here, the correlation of a case where a satellite assumed by a GPS receiver device matches an actual satellite is defined as a "correct correlation". In contrast to this, the correlation of a case where a satellite assumed by the GPS receiver device is different from an actual satellite is defined as a "cross correlation". The occurrence of a cross correlation indicates that a satellite signal is acquired from a satellite other than another satellite that is assumed by the GPS receiver device. This indicates that the acquisition of a GPS satellite signal is not appropriately performed. When the cross correlation occurs, there is a problem in that the accuracy of calculation of a position decreases. Thus, various techniques used for determining a cross correlation are proposed (for example, JP-A-2003-84055).

According to the technique disclosed in JP-A-2003-84055, a cross correlation is determined by performing a threshold value determination process for a correlation value acquired by the correlation calculation in a stepped manner. In the technique disclosed in JP-A-2003-84055, in order to realize the determination of a cross correlation, it is necessary to appropriately set stepwise threshold values. Meanwhile the reception status such as the signal strength or the reception environment at the time of receiving a GPS satellite signal by using the receiver device changes every time. Accordingly, in a case where a cross correlation is determined based on a uniform determination criterion, there is a problem in that the accuracy of the determination is not assured. Being unable to correctly detect a cross correlation is being unable to correctly determine the adequacy of the acquisition of a satellite signal.

SUMMARY

An advantage of some aspects of the invention is that it provides a new technique for determining the adequacy of the acquisition of a satellite signal.

A first aspect of the invention is directed to a method of determining adequacy. The method includes: attempting to acquire a satellite signal from a satellite and decoding first satellite orbit data; and determining the adequacy of acquisition of the satellite signal by using the first satellite orbit data and second satellite orbit data of the satellite that has been acquired.

As another aspect, the invention may be configured as an adequacy determining device including: a decoding unit that attempts to acquire a satellite signal from a satellite and decodes first satellite orbit data; and a determination unit that determines the adequacy of acquisition of the satellite signal by using the first satellite orbit data and second satellite orbit data of the satellite that has been acquired.

According to the first aspect and the like, the adequacy of the acquisition of a satellite signal is determined by using the first satellite orbit data that is acquired by attempting to acquire a satellite signal from a satellite and decoding the satellite signal and the second satellite orbit data of the satellite that has been acquired. The second satellite orbit data has been acquired and is satellite orbit data of the satellite from which the first satellite orbit data is decoded. Accordingly, in a case where the first satellite orbit data has the same meaning and content as those of the second satellite orbit data or is data of which a difference from the second satellite orbit data is small, it can be determined that the acquisition of the satellite signal is adequately performed.

As a second aspect, the method of determining the adequacy according to the first aspect may be configured such that the determining of the adequacy includes determining the adequacy of acquisition of the satellite signal based on a difference between a value of a satellite orbit parameter that is stored in the first satellite orbit data and a value of a satellite orbit parameter that is stored in the second satellite orbit data.

According to the second aspect, the adequacy of the acquisition of the satellite signal is determined based on a difference between the value of the satellite orbit parameter that is stored in the first satellite orbit data and the value of the satellite orbit parameter that is stored in the second satellite orbit data. In a case where the acquisition of the satellite signal is adequately performed, the difference between the values of the satellite orbit parameters is small. Accordingly, the adequacy of the acquisition of the satellite signal can be determined by using the difference between the values of the satellite orbit parameters as an index.

In addition, as a third aspect, the method of determining the adequacy according to the second aspect may be configured such that the determining of the adequacy includes determining the adequacy of acquisition of the satellite signal based on at least a difference between a satellite position designation value included in the satellite orbit parameter that is stored in the first satellite orbit data and a satellite position designation value included in the satellite orbit parameter that is stored in the second satellite orbit data.

According to the third aspect, the adequacy of the acquisition of the satellite signal is determined based on at least a difference between a satellite position designation value included in the satellite orbit parameter that is stored in the first satellite orbit data and a satellite position designation value included in the satellite orbit parameter that is stored in the second satellite orbit data. Since the satellite position designation value is unique to each satellite, it can be preferably used for determining the adequacy of the acquisition of the satellite signal.

In addition, as a fourth aspect, the method of determining the adequacy according to the first aspect may be configured such that the determining of the adequacy includes: calculating a first satellite position of the satellite by using the first satellite orbit data; calculating a second satellite position of the satellite by using the second satellite orbit data; and determining the adequacy of acquisition of the satellite signal based on a difference between the first satellite position and the second satellite position.

According to the fourth aspect, the adequacy of the acquisition of the satellite signal is determined based on a difference between the first satellite position of the satellite that is calculated by using the first satellite orbit data and the second satellite position of the satellite that is calculated by using the second satellite orbit data. In a case where the acquisition of the satellite signal is adequately performed, the difference between the first satellite position and the second satellite position (a distance between two satellite positions) is small. Accordingly, the adequacy of the acquisition of the satellite signal can be determined by using the difference between the satellite positions as an index.

In addition, as a fifth aspect, the method of determining the adequacy according to any one of the first to fourth aspects may be configured such that the first satellite orbit data is ephemeris, and the second satellite orbit data is any one of almanac, ephemeris, and long-term ephemeris.

According to the fifth aspect, the adequacy of the acquisition of the satellite signal can be determined by configuring the first satellite orbit data as ephemeris and the second satellite orbit data as any one of almanac, ephemeris, and long-term ephemeris.

Here, the first satellite orbit data is data acquired by attempting to acquire a satellite signal and decoding the satellite signal. In order to decode a satellite signal, some degree of time is required. From that point, according to the fifth aspect, the ephemeris out of the satellite orbit data acquired by decoding a satellite signal is set as the first satellite orbit data. Accordingly, the adequacy of the acquisition can be determined, for example, without decoding the almanac, and a time required for determining the adequacy of the acquisition of the satellite signal can be relatively shortened.

In addition, as a sixth aspect, the method of determining the adequacy according to the fifth aspect may be configured such that the method further includes changing a determination condition of the adequacy of the acquisition based on whether the second satellite orbit data is any one of the almanac, the ephemeris, and the long-term ephemeris.

The prediction accuracy of the satellite orbit differs in accordance with the type of the satellite orbit data. Accordingly, as in the sixth aspect, it is preferable to appropriately determine the adequacy of the acquisition of the satellite signal by changing the determination condition for the adequacy of the acquisition based on whether the second satellite orbit data is any one of the almanac, the ephemeris, and the long-term ephemeris.

In addition, as a seventh aspect, the method of determining the adequacy according to any one of the first to sixth aspects may be configured such that the second satellite orbit data is assistance data acquired through server assistance.

According to the seventh aspect, the adequacy of the acquisition of the satellite signal can be determined by using the second satellite orbit data as the assistance data acquired through the server assistance.

In order to determine the adequacy of the acquisition of the satellite signal more correctly, the second satellite orbit data needs to be reliable data. From that point, according to the seventh aspect, the second satellite orbit data is the assistance data acquired through the server assistance. The assistance data, for example, is the almanac or the ephemeris that is acquired by acquiring a satellite signal in an environment in which a reception signal is a signal of a strong electric field and decoding the satellite signal or the long-term ephemeris (satellite orbit data for a period longer than that of the ephemeris that is transmitted from the satellite) that is calculated based on a prediction result of the satellite position in the future. Since the assistance data is data decoded in a good reception environment and is data that is based on an accurate prediction, it has high reliability as the satellite orbit data. Accordingly, the adequacy of the acquisition of the satellite signal can be determined more correctly by using the assistance data when the adequacy of the acquisition of the satellite signal is determined.

BRIEF DESCRIPTION OF THE DRAWINGS

The invention will be described with reference to the accompanying drawings, wherein like numbers reference like elements.

FIG. 2 is a diagram showing an example of a table in which approximation conditions are set.

FIG. 10 is a diagram showing a modified example of a table in which the approximation conditions are set.

FIG. 11 is a diagram showing an example of the table configuration of an approximate condition threshold value table.

DESCRIPTION OF EXEMPLARY EMBODIMENTS

Figure 1:
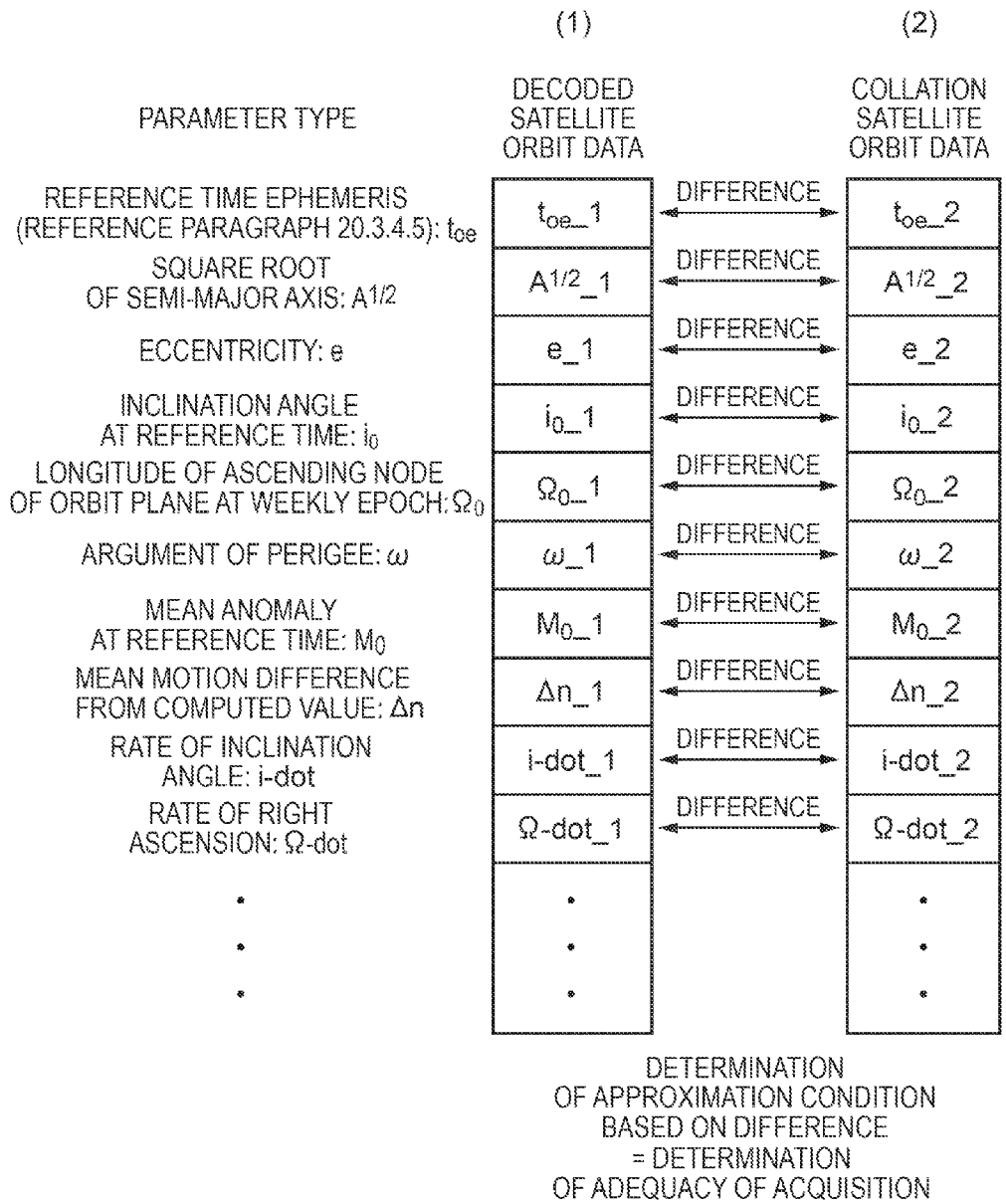
FIG. 1 is an explanatory diagram illustrating a method of determining the adequacy.

Hereinafter, an example of a preferred embodiment according to the invention will be described. However, it is apparent that the embodiment of the invention is not limited to the embodiment described below.

1. Principle

First, a method of determining the adequacy according to this embodiment will be described. In this embodiment, a GPS (Global Positioning System) as one type of satellite positioning system will be described as an example, and a case will be described in which the adequacy of the acquisition of a GPS satellite signal is determined when the GPS satellite signal transmitted from a GPS satellite is received and acquired.

In a satellite positioning system using a GPS, a GPS satellite as one type of positioning satellite transmits a navigation message including satellite orbit data such as ephemeris or almanac with being carried in a GPS satellite signal as one type of positioning satellite signal. The GPS satellite signal is a communication signal of 1.57542 [GHz] that is modulated with a C/A (Coarse and Acquisition) code as one type of spread code based on a CDMA (Code Division Multiple Access) system known as a spectrum spreading system. The C/A code is a pseudo random noise code, in which a code length of a 1023 chip is set as 1 PN frame, having a repetition period of 1 ms and is a code that is unique to each GPS satellite.

The frequency used when the GPS satellite transmits a GPS satellite signal is predefined as 1.57542 [GHz] (hereinafter, referred to as a "defined carrier frequency"). However, based on the effect of Doppler that occurs in accordance with the movement of the GPS satellite and the GPS receiver device and the like, the frequency of the GPS satellite signal when it is received by the GPS receiver device does not necessarily match the defined carrier frequency. Accordingly, in the GPS receiver device, a technique is used in which a GPS satellite signal is acquired by calculating a correlation with a replica C/A code as a pseudo C/A code generated inside the device for a signal acquired by receiving the GPS satellite signal in the frequency direction and the phase direction.

The calculation of the correlation in the frequency direction is a calculation (a so-called frequency search) used for specifying the frequency (hereinafter, referred to as a "reception frequency") of a "received carrier signal" as a signal of a carrier wave (carrier) signal that is received. In addition, the calculation of the correlation in the phase direction is a calculation (a so-called phase search) used for specifying the phase (hereinafter, referred to as a "code phase") of a "received C/A code" as a C/A code of a received signal.

As a specific processing sequence, for example, when the carrier is removed from the received carrier signal and when a correlation between the received C/A code and the replica C/A code is calculated, the calculation of the correlation is performed while changing the frequency of a carrier removing signal and the phase of the replica C/A code. Then, the frequency of the carrier removing signal and the phase of the replica C/A code are specified at which the correlation value acquired through the correlation calculation is the maximum.

A unique C/A code is assigned to each GPS satellite. The GPS receiver device, for a GPS satellite (hereinafter, referred to as a "acquisition target satellite") as an acquisition target, performs the acquisition of a GPS satellite signal from the acquisition target satellite using a replica C/A code that is a replica of the C/A code of the acquisition target satellite. The acquisition target satellite can be described also as a satellite (an acquisition-desired satellite) of which the GPS satellite signal is desired to be acquired by the GPS receiver device.

Since the C/A code is a so-called gold code, a high correlation value is not acquired unless a correlation with a correct GPS satellite signal is calculated. However, the overall magnitude of the acquired correlation value changes based on the reception situation of a GPS satellite signal. In other words, in an environment (hereinafter, referred to as a "strong electric-field environment") in which a received signal is a signal of a strong electric field, the correlation value tends to be larger than that in an environment (hereinafter, referred to as a "weak electric-field environment") in which a received signal is a signal of a weak electric field.

As a result, particularly in the strong electric-field environment, even in a case where a GPS satellite that is assumed as an acquisition target is different from an actual GPS satellite, there are cases where the correlation value is a large value to some degree. In such a case, when the correlation is determined to be acquired (a successful acquisition) due to a peak value (hereinafter, referred to as a "peak correlation value") of correlation values that exceeds a predetermined threshold value, a cross correlation is acquired. In a case where the cross correlation occurs, a GPS satellite signal is acquired from a satellite other than a satellite that is originally assumed by the GPS receiver device. In this case, the acquisition of a GPS satellite signal is not appropriately performed, which becomes a factor that decreases the accuracy of the position calculation.

In view of such a problem, the inventors of the invention, focusing on the satellite orbit data carried in the GPS satellite signal, contrives a technique for determining the adequacy of the acquisition of a GPS satellite signal by using satellite orbit data acquired by decoding an acquired GPS satellite signal. The satellite orbit data carried in the GPS satellite signal indicates ephemeris and almanac.

The inventors of the invention have considered determining the adequacy of the acquisition of a GPS satellite signal by using satellite orbit data acquired by decoding an acquired GPS satellite signal and satellite orbit data that has been completed to be acquired from the acquisition-desired satellite (acquisition target satellite). In other words, when a cross correlation is generated, not the satellite orbit data of an acquisition-desired satellite but the satellite orbit data of another satellite is decoded. Accordingly, the decoded satellite orbit data and the satellite orbit data that has been completed to be acquired from the acquisition-desired satellite are collated. Then, as a result, in a case where the decoded satellite orbit data (first satellite orbit data) and the satellite orbit data (second satellite orbit data) that have been completed to be acquired from the acquisition-desired satellite have relation that satisfies a predetermined approximation condition, it can be determined that the acquisition of the GPS satellite signal is appropriately performed.

In the description described below, the satellite orbit data acquired by decoding the acquired GPS satellite signal is referred to as "decoded satellite orbit data". In addition, the satellite orbit data used in the collation of the decoded satellite orbit data is referred to as "collation satellite orbit data". In this embodiment, the decoded satellite orbit data is set as ephemeris, the collation satellite orbit data is set as one of almanac, a long term ephemeris (LTE), and ephemeris, and the adequacy of the acquisition of a GPS satellite signal is determined.

The long-term ephemeris (LTE) is one type of satellite orbit data and is prediction data of a satellite orbit for a period that is longer than that of the ephemeris transmitted from the GPS satellite. For example, a period as a prediction target is set as a long period such as one week, and data of the predicted orbit of the GPS satellite for each period acquired by dividing the period of one week for every predetermined period such as four hours, six hours, or eight hours is stored. Since the long-term ephemeris is data predicting the satellite orbit for a long period, it may be called "long-term prediction ephemeris". Since the long-term ephemeris is based on a prediction with high accuracy, the reliability of the satellite orbit data can be regarded to be high.

The collation satellite orbit data, for example, may be set as assistance data acquired by server assistance. In such a case, it is considered that an electronic apparatus, in which a GPS is built, acquires the collation satellite orbit data as assistance data by accessing a predetermined server. Then, the adequacy of the acquisition of a GPS satellite signal is determined by using the decoded satellite orbit data that is acquired by performing the acquisition of a GPS satellite signal transmitted from a GPS satellite and decoding the acquired GPS satellite signal and the collation satellite orbit data that has been completed to be acquired from the GPS satellite.

1-1. First Determination Method

A first determination method is a method of determining the adequacy of the acquisition of a GPS satellite signal based on differences between the values of satellite orbit parameters stored in the decoded satellite orbit data and the values of satellite orbit parameters stored in the collation satellite orbit data.

FIG. 1 is an explanatory diagram illustrating the first determination method. Values of satellite orbit parameters that are stored in the decoded satellite orbit data are schematically shown in (1) of FIG. 1, and values of satellite orbit parameters that are stored in the collation satellite orbit data are schematically shown in (2) of FIG. 1. Since the decoded satellite orbit data is the ephemeris, (1) of FIG. 1 corresponds to values of the satellite orbit parameters that are stored in the ephemeris. In addition, while the collation satellite orbit data is one of the almanac, the long-term ephemeris, and the ephemeris, for example, in a case where the almanac is used as the collation satellite orbit data, (2) of FIG. 1 corresponds to the values of the satellite orbit parameters that are stored in the almanac.

In FIG. 1, various satellite orbit parameters are represented. As the main satellite orbit parameters among them, there are, known as Kepler's orbital elements, a square root of the semi-major axis $A^{1/2}$, the eccentricity "e", the longitude of ascending node of the orbit plane at weekly epoch "$\Omega_0$", an inclination angle at reference time "$i_0$", an argument of perigee "$\omega$", and a mean anomaly at reference time "$M_0$".

The square root of the semi-major axis $A^{1/2}$ is the square root of the semi-major axis of the satellite orbit and is stored in a second sub frame of the navigation message. The eccentricity "e" is a value that indicates the degree of swelling of the ellipse of the satellite orbit and is stored in the second sub frame of the navigation message. The longitude of the ascending node of the orbit plane at weekly epoch "$\Omega_0$" is an angle formed by a reference direction representing the vernal equinox and the ascending node and is stored in a third sub frame of the navigation message. The inclination angle at reference time "$i_0$" is an angle formed by the satellite orbit plane and the equatorial plane of the earth and is stored in the third sub frame of the navigation message. The argument of perigee "$\omega$" is an angle formed by the ascending node and perigee and is stored in the third sub frame of the navigation message. In addition, the mean anomaly at reference time "$M_0$" is a value that is conveniently used for designating the position of a satellite at a specific angle on the orbit of the satellite. The mean anomaly at reference time "$M_0$" corresponds to a designated value of the location of the satellite and is stored in the second sub frame of the navigation message.

For example, a case will be considered in which the almanac is set as the collation satellite orbit data. The accuracy of the prediction of the satellite orbit in the case of the ephemeris is different from that in the case of the almanac. The ephemeris is data relating to detailed satellite orbits of GPS satellites, and the prediction accuracy thereof is regarded to be extremely high. On the other hand, the almanac is data relating to schematic satellite orbits of GPS satellites, and the accuracy of the prediction thereof is lower than that of the ephemeris. Accordingly, there is a difference between the values of the satellite orbit parameters of the decoded satellite orbit data (ephemeris) and the satellite orbit parameters of the collation satellite orbit data (almanac).

However, the values of the satellite orbit parameters of the decoded satellite orbit data and the collation satellite orbit data, which are described above, of the same GPS satellite are values that are similar to each other. Thus, in the first determination method, differences between the values of the satellite orbit parameters of the decoded satellite orbit data and the values of the satellite orbit parameters of the collation satellite orbit data are calculated. Then, a determination of approximate conditions is performed based on the calculated differences, whereby it is determined whether the acquisition of the GPS satellite signal is adequate. In other words, in a case where the approximation conditions are satisfied, it is determined that the acquisition of the GPS satellite signal is adequately performed. On the other hand, in a case where the approximation conditions are not satisfied, it is determined that the acquisition of the GPS satellite signal is not adequately performed.

FIG. 2 is a diagram showing an example of a table in which the approximation conditions are set. In the table shown in FIG. 2, several types of conditions considered as the approximation conditions are represented as an example. More, specifically, the content of each approximation condition is set in association with an approximation condition number.

An approximation condition A is set in which the ratio of the satellite orbit parameters, of which values approach each other, exceeds a predetermined threshold value "$\theta_p$ [%]". The approach of values indicates, for example, that a difference calculated for each satellite orbit parameter is less than a predetermined threshold value (or is equal to or less than the threshold value) set for each satellite orbit parameter. In a case where the ratio of the numbers of satellite orbit parameters, for which the values of the decoded satellite orbit data and the collation satellite orbit data approach each other, to the total number of the satellite orbit parameters as collation targets exceeds "$\theta_p$ [%]", the approximation condition A is satisfied.

An approximation condition B is set in which a total of differences between the satellite orbit parameters is less than a predetermined threshold value "$\theta_{total}$". A value acquired by adding differences calculated for each satellite orbit parameter is a small value to some degree, the approximation condition B is satisfied. Here, since the units of the satellite orbit parameters are different from one another, for example, it is necessary to calculate the sum of differences after normalizing the satellite orbit parameters.

An approximation condition C is set in which a difference between mean anomalies at reference time "$M_0$" is less than a predetermined threshold value "$\theta_M$". The mean anomaly at reference time "$M_0$" is one of the Kepler's satellite orbit elements and is a value that is used for designating the position of a GPS satellite at a specific angle on the satellite orbit.

There is a reason for setting the approximation condition with the mean anomaly at reference time "$M_0$" taken into consideration. Even in a case where the approximation condition is determined for satellite orbit parameters that are common to satellites or satellite orbit parameters that are not common but have similar values between satellites, it cannot be determined whether there is a cross correlation. When a cross correlation occurs, satellite orbit data of a satellite other than a satellite that is assumed by the GPS receiver device is decoded. In this case, when the satellite orbit parameter having a value that does not change (or having a small change in the value) for a plurality of satellites is considered, the same value is acquired either in the case of a correct correlation or in the case of a cross correlation. Accordingly, the correctness of the correlation cannot be determined.

In contrast to this, in a case where a satellite orbit parameter that is unique to each satellite is considered, there is a distinctive difference between values acquired in the case of a correct correlation and the case of a cross correlation, whereby the correctness of the correlation can be determined. Since the mean anomaly at reference time "$M_0$" is a value that is unique to each satellite and can be regarded as a preferred satellite orbit parameter for a collation.

In addition, approximation conditions D and E are approximation conditions acquired by combining differences among a plurality of types of satellite orbit parameters. For the above-described reason, the mean anomaly at reference time "$M_0$" is set as an essential parameter. For example, the approximation condition D is set in which a difference between the mean anomalies at reference time "$M_0$" is less than a predetermined threshold value "$\theta_M$", and a difference between the longitudes of the ascending nodes of the orbit plane at weekly epoch "$\Omega_0$" as one type of satellite orbit parameter is less than a predetermined threshold value "$\theta_\Omega$".

Similarly, the approximation condition E is set in which a difference between the mean anomalies at reference time "$M_0$" is less than the predetermined threshold value "$\theta_M$", and a difference between arguments of perigee "$\Omega_\omega$" as one type of satellite orbit parameter is less than a predetermined threshold value "$\theta_\omega$".

Among the above-described approximation conditions presented as examples, by using the approximation condition C, the adequacy of the acquisition can be determined in a simplest manner. The reason for this is that the determination is made by calculating a difference only for one satellite orbit parameter and making a threshold value determination for the difference. However, in order to decode satellite orbit data from an acquired GPS satellite signal, the occurrence of an event such as a decoding error or a lack of a bit value may be considered depending on the reception status of the GPS satellite signal. Accordingly, in a case where the values of the mean anomalies at reference time "$M_0$" are not correctly decoded, the adequacy of the acquisition of the GPS satellite signal is incorrectly determined.

The above-described problem occurs similarly for the other approximation conditions. Thus, it is effective to combine two or more approximation conditions as an "AND" condition or an "OR" condition.

Figure 3:
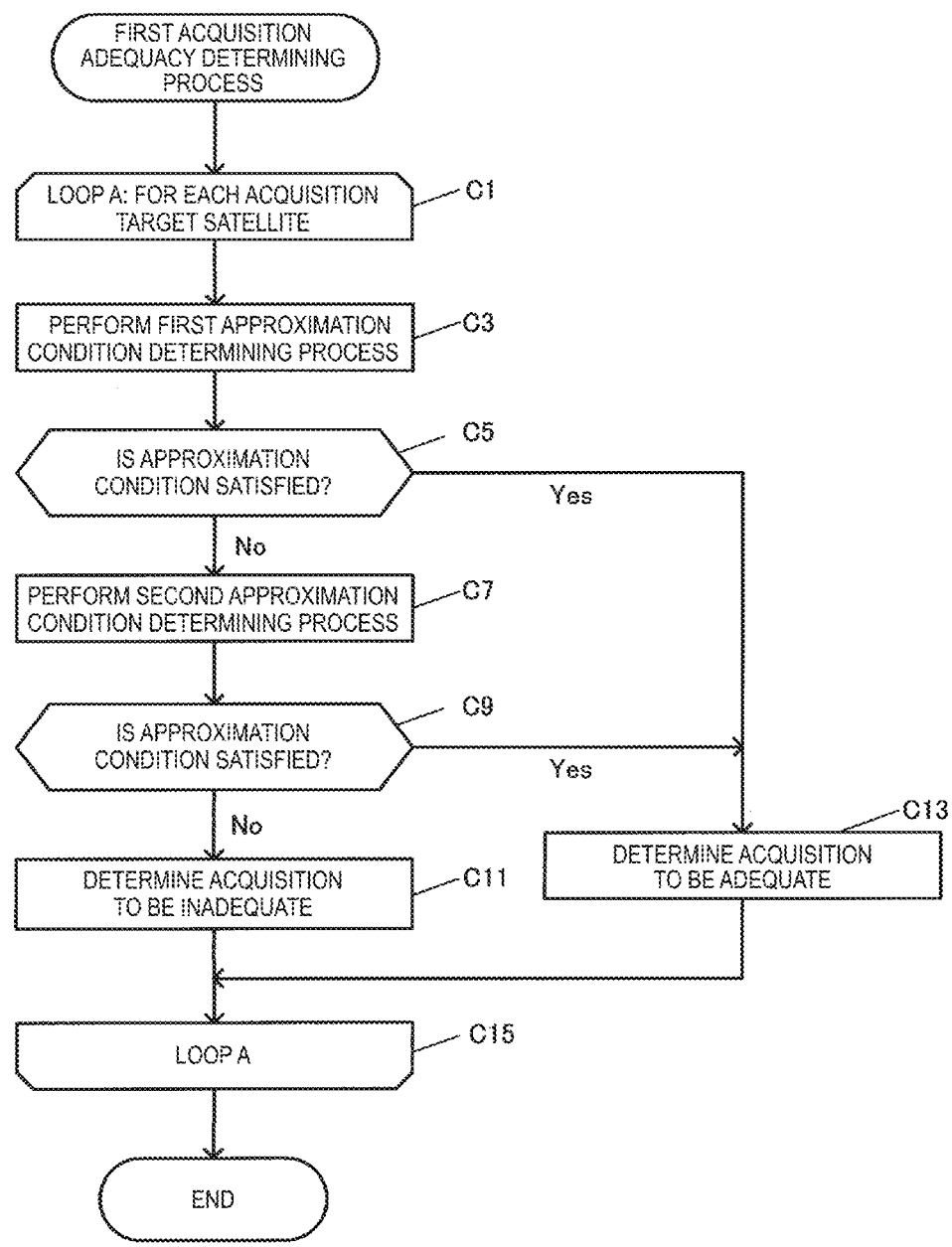
FIG. 3 is a flowchart showing the flow of a first acquisition adequacy determining process.

FIG. 3 is a flowchart showing the flow of a first acquisition adequacy determining process as an example of the process of determining the adequacy of the acquisition of a GPS satellite signal by applying the first determination method. In this process, the process of loop A is performed for each satellite as an acquisition target (Steps C1 to C15).

In the process of loop A, first, a first approximation condition determining process is performed (Step C3). More specifically, decoded satellite orbit data and collation satellite orbit data are collated, and it is determined whether one approximation condition selected from among the approximation conditions set as shown in FIG. 2 is satisfied. In a case where it is determined that the approximation condition is satisfied in this determination process (Step C5; Yes), the adequacy of the acquisition is determined (Step C13). Accordingly, in the first approximation condition determining process, in a case where data, of which the data amount is as small as possible, is set as a determination target, the acquisition time of a signal can be shortened, which is preferable. For example, the approximation condition C is preferable.

Next, it is determined whether the approximation condition is satisfied in the first approximation condition determining process (Step C5), and, in a case where it is determined that the approximation condition is not satisfied (Step C5; No), a second approximation condition determining process is performed (Step C7). More specifically, it is determined whether or not one approximation condition other than the approximation condition used in the first approximation condition determining process is satisfied. Since this second approximation condition determining process is a process assuming a case where a determination fails in the first approximation condition determining process, it is effective to use an approximation condition of which the property is different from that of the approximation condition used in the first approximation condition determining process. For example, the approximation condition A is preferable.

Then, it is determined whether or not the approximation condition is satisfied in the second approximation condition determining process (Step C9). In a case where it is determined that the approximation condition is not satisfied (Step C9; No), it is determined that the acquisition of a GPS satellite signal is not adequate (Step C11), and the process proceeds to the next acquisition target satellite.

On the other hand, in a case where it is determined that the approximation condition is satisfied in Step C5 or C9 (Step C5; Yes or Step C9; Yes), it is determined that the acquisition of a GPS satellite signal is adequately performed (Step C13), and the process proceeds to the next acquisition target satellite.

After the process of Steps C3 to C13 is performed for all the acquisition target satellites, the process of loop A is completed (Step C15), and the first acquisition adequacy determining process ends.

1-2. Second Determination Method

A second determination method is a method of determining the adequacy of the acquisition of a GPS satellite signal based on a difference between the position (hereinafter, referred to as a "first satellite position") of an acquisition-desired satellite (an acquisition target satellite) that is calculated by using the decoded satellite orbit data and the position (hereinafter, referred to as a "second satellite position") of the same acquisition-desired satellite that is calculated by using the collation satellite orbit data.

When both of the decoded satellite orbit data and the collation satellite orbit data are data relating to the satellite orbit of the same GPS satellite, the first satellite position and the second satellite position should be positions close to each other. However, when a cross correlation occurs, the satellite orbit data of a satellite other than the acquisition-desired satellite is decoded, and accordingly, the first satellite position and the second satellite position are positions departed from each other.

Thus, a difference between the first satellite position and the second satellite position, that is, a distance between the first satellite position and the second satellite position is calculated. Then, in a case where the calculated distance is less than a predetermined threshold distance (or equal to or less than the threshold distance), it is determined that the GPS satellite signal is adequately acquired.

2. Example

Next, an example of an adequacy determining device will be described which determines the adequacy based on the above-described principle will be described. Here, an example will be described in a case where an embodiment of the invention is applied to a cellular phone as an example of an electronic apparatus including the adequacy determining device. However, it is apparent that an example to which the invention can be applied is not limited to the example described below.

2-1. Functional Configuration

Figure 4:
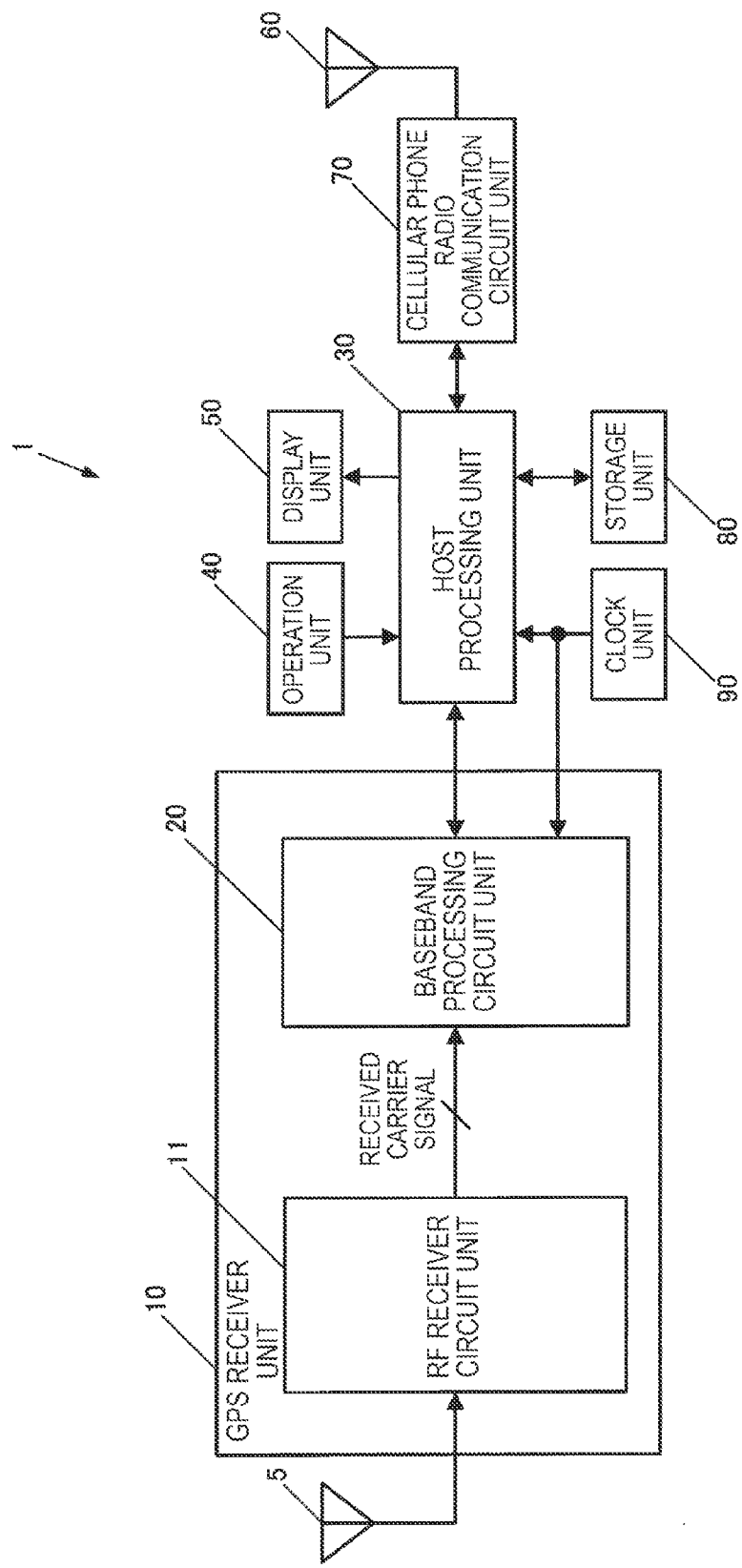
FIG. 4 is a block diagram showing an example of the functional configuration of a cellular phone.

FIG. 4 is a block diagram showing an example of the functional configuration of the cellular phone 1 according to this example. The cellular phone 1 is configured so as to include: a GPS antenna 5; a GPS receiver unit 10; a host processing unit 30; an operation unit 40; a display unit 50; a cellular phone antenna 60; a cellular phone radio communication circuit unit 70; a storage unit 80, and a clock unit 90.

The GPS antenna 5 is an antenna that receives an RF (Radio Frequency) signal including a GPS satellite signal transmitted from a GPS satellite and outputs the received signal to the GPS receiver unit 10.

The GPS receiver unit 10 is a position calculating circuit or a position calculating device that measures the position of the cellular phone 1 based on a signal output from the GPS antenna 5 and is a functional block that corresponds to a so-called GPS receiver device. The GPS receiver unit 10 is configured so as to include an RF receiver circuit unit 11 and a baseband processing circuit unit 20. Here, the RF receiver circuit unit 11 and the baseband processing circuit unit 20 may be manufactured as different LSIs (Large Scale Integrations) or may be manufactured as one chip.

The RF receiver circuit unit 11 is a receiver circuit of an RF signal. As the circuit configuration, for example, a configuration may be employed in which an RF signal output from the GPS antenna 5 is converted into a digital signal by an A/D converter, and a receiver circuit processes the digital signal. Alternatively, a configuration may be employed in which an RF signal output form the GPS antenna 5 is processed while maintained as an analog signal and A/D conversion is finally performed so as to output a digital signal to the baseband processing circuit unit 20.

In the latter case, for example, the RF receiver circuit unit 11 may be configured as below. An oscillation signal used for RF signal multiplication is generated by performing dividing or multiplying of the frequency of a predetermined oscillation signal. Then, by multiplying the generated oscillation signal by an RF signal output from the GPS antenna 5, the RF signal is down-converted into a signal (hereinafter, referred to as an IF (Intermediate Frequency) signal) of an intermediate frequency, the IF signal is amplified and the like, then is converted into a digital signal by the A/D converter, and the digital signal is output to the baseband processing circuit unit 20.

The baseband processing circuit unit 20 is a processing circuit block that acquires a GPS satellite signal by performing a correlation process or the like for a received carrier signal output from the RF receiver circuit unit 11 and calculates the position (position coordinates) of the cellular phone 1 by performing predetermined position calculation based on satellite orbit data, time data, or the like that is fetched from the GPS satellite signal.

In this example, the baseband processing circuit unit 20 serves as an adequacy determining device. More specifically, the baseband processing circuit unit 20 serves as a decoding unit that acquires a GPS satellite signal from an acquisition-desired satellite and decodes satellite orbit data and serves as a determination unit that determines whether or not the acquisition of the GPS satellite signal is adequate by using the decoded satellite orbit data (first satellite orbit data) and the collation satellite orbit data (second satellite orbit data) that has been acquired for the acquisition-desired satellite.

The host processing unit 30 is a processor that controls the overall operations of the units of the cellular phone 1 in accordance with various programs such as a system program and the like that are stored in the storage unit 80. The host processing unit 30, based on the acquired position coordinates acquired from the baseband processing circuit unit 20, displays a map in which the current position is instructed on the display unit 50 or uses the position coordinates in various application processes.

The operation unit 40 is an input device that is, for example, configured by a touch panel, button switches, or the like and outputs a signal of a key or a button that is pressed to the host processing unit 30. In accordance with the operation of the operation unit 40, inputs of various instructions such as a call request, a mail transmission or reception request, a position calculating request, and the like are made.

The display unit 50 is configured by an LCD (Liquid Crystal Display) or the like and is a display device that performs various displays based on a display signal input from the host processing unit 30. On the display unit 50, a position display screen, time information, and the like are displayed.

The cellular phone antenna 60 is an antenna that transmits and receives a wireless signal for a cellular phone to and from a wireless base station installed by a communication service provider of the cellular phone 1.

The cellular phone radio communication circuit unit 70 is a cellular phone communication circuit unit that is configured by an RF conversion circuit, a baseband processing circuit, and the like and realizes a phone call, the transmission or reception of a mail, or the like by performing modulation, demodulation, or the like of a wireless signal for a cellular phone.

The storage unit 80 is a storage device that stores a system program used by the host processing unit 30 for controlling the cellular phone 1 or various programs, data, and the like used for performing various application processes.

The clock unit 90 is an internal clock of the cellular phone 1 and is configured so as to include an oscillation circuit such as a crystal oscillator. The measured time of the clock unit 90 is output to the baseband processing circuit unit 20 and the host processing unit 30 as needed.

2-2. Circuit Configuration of Baseband Processing Circuit Unit

Figure 5:
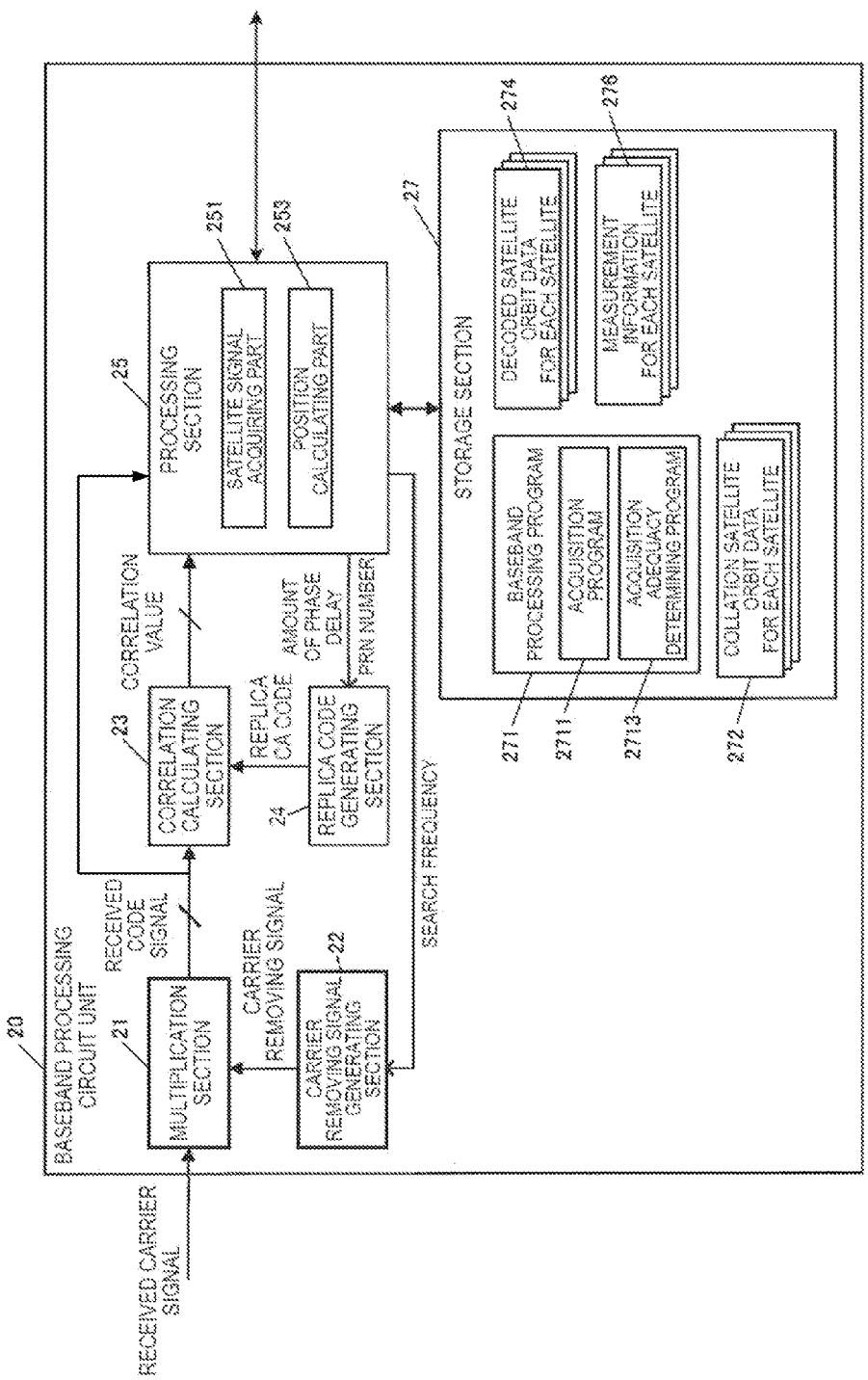
FIG. 5 is a diagram showing an example of the circuit configuration of a baseband processing circuit unit.

FIG. 5 is a diagram showing an example of the circuit configuration of the baseband processing circuit unit 20 and is a diagram focusing on circuit blocks according to this example. The baseband processing circuit unit 20, for example, is configured so as to include: a multiplication section 21; a carrier removing signal generating section 22; a correlation calculating section 23; a replica code generating section 24; a processing section 25; and a storage section 27.

The multiplication section 21 is a circuit unit that removes a carrier (carrier wave) from a received carrier signal by multiplying the received carrier signal which is a received signal of an I phase and a Q phase by a carrier removing signal generated by the carrier removing signal generating section 22 and is configured so as to include a multiplier and the like. The carrier removing signal generating section 22 creates and generates a carrier removing signal corresponding to a search frequency instructed by the processing section 25 and outputs the carrier removing signal to the multiplication section 21.

Although a circuit block that separates IQ components of the received signal (IQ separation) is not shown in the figure, for example, when the received signal is down-converted into an IF signal in the RF receiver circuit unit 11, the IQ separation may be performed by multiplying the received signal by a local oscillation signal having a phase difference of 90 degrees. In addition, in a case where the signal output form the RF receiver circuit unit 11 is an IF signal, a carrier removing signal of an IF frequency may be generated. As above, even to a case where the received signal is down-converted into an IF signal by the RF receiver circuit unit 11, this embodiment can be applied in the substantially same manner.

The carrier removing signal generating section 22 is a circuit that generates a carrier removing signal that has the same frequency as the frequency of the carrier signal of the GPS satellite signal and is configured so as to include an oscillator such as a carrier NCO (Numerical Controlled Oscillator). In a case where the received carrier signal is an IF signal, the carrier removing signal generating section 22 generates a signal of the IF frequency. The carrier removing signal generating section 22 generates an I-phase carrier removing signal for a received signal of the I phase and a Q-phase carrier removing signal for a received signal of the Q phase and outputs the carrier removing signals to the multiplication section 21. The Q-phase carrier removing signal is a signal having a phase that is different from that of the I-phase carrier removing signal by 90 degrees.

By multiplying the received carrier signal by the carrier removing signal generated by the carrier removing signal generating section 22 in the multiplication section 21, the received carrier signal is demodulated (detected), whereby a received code signal from which the carrier is removed is generated and output. In other words, by multiplying a received signal of the I phase by the I-phase carrier removing signal in the multiplication section 21, the received code signal of the I phase is demodulated, and, by multiplying a received signal of the Q phase by the Q-phase carrier removing signal, the received code signal of the Q phase is demodulated. The multiplication section 21 and the carrier removing signal generating section 22 can be described as a demodulation (detection) unit.

The correlation calculating section 23 is a circuit unit that calculates a correlation between the reception code signals of the I and Q phases that are output from the multiplication section 21 and the replica C/A code that is created and generated by the replica code generating section 24 and is configured so as to include a plurality of correlators and the like.

The replica code generating section 24 is a circuit unit that creates and generates the replica C/A code that is a replica simulating a C/A code and is configured so as to include an oscillator such as a code NCO. The replica code generating section 24 creates and generates a replica C/A code according to a satellite number and the amount of phase delay that are instructed from the processing section 25 and outputs the generated replica C/A code to the correlation calculating section 23. The correlation calculating section 23 calculates a correlation between each one of the reception codes of the I and Q phases and the replica C/A code generated by the replica code generating section 24.

The processing section 25 is a control device and calculation device that controls the overall operation of each functional unit of the baseband processing circuit unit 20 and is configured so as to include a processor such as a CPU (Central Processing Unit). The processing section 25 includes a satellite signal acquiring part 251 and a position calculating part 253 as its main functional parts.

The satellite signal acquiring part 251 detects the frequency (reception frequency) of the received carrier signal and the phase (code phase) of the received C/A code by determining the peaks of the results (correlation values) of correlation calculations in the frequency direction and the phase direction that are output from the correlation calculating section 23. Then, the satellite signal acquiring part 251 stores the reception frequency and the code phase that have been detected in the storage section 27 as measurement information and uses the reception frequency and the code phase for calculating the position or the like. In addition, the satellite signal acquiring part 251 decodes satellite orbit data based on the correlation value output from the correlation calculating section 23 and stores the decoded satellite orbit data in the storage section 27 and uses the decoded satellite orbit data for determining the adequacy of the acquisition of a satellite signal, calculating the position, and the like.

When the phase (carrier phase) of the received carrier signal and the phase (code phase) of the received C/A code are detected so as to be in a state in which a correlation can be calculated, the value of each bit configuring a navigation message can be acquired based on a change in the correlation value according to time. This phase synchronization, for example, is realized by a PLL (Phase Locked Loop) known as a phase locked loop and data bits of the navigation message are decoded in accordance with a change according to time in the correlation value for the received code signal of the I phase.

The position calculating part 253 calculates the position of the cellular phone 1 by performing a known position calculating process using the measurement information acquired for each acquired satellite by the satellite signal acquiring part 251 and a navigation message decoded for each acquired satellite. The calculated position is output to the host processing unit 30 and is used for various applications.

The storage section 27 is configured by a storage device (memory) such as a ROM (Read Only Memory), a flash ROM, or a RAM (Random Access Memory) and stores the system program of the baseband processing circuit unit 20, various programs used for realizing various functions such as a satellite signal acquiring function and a position calculating function, data, and the like. In addition, the storage section 27 includes a work area in which intermediate data of various processes, the processing results, and the like are temporarily stored.

Figure 6:
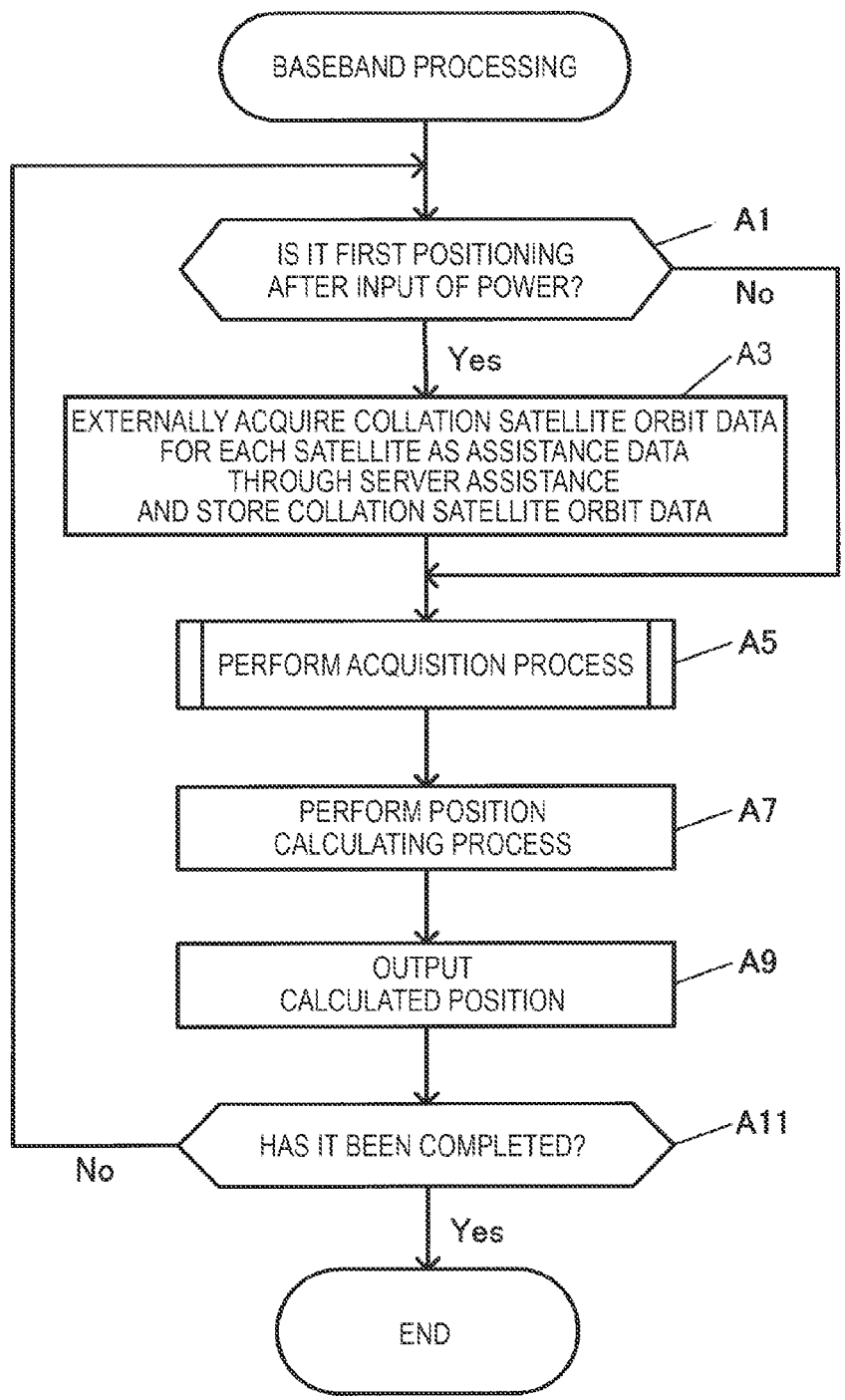
FIG. 6 is a flowchart showing the flow of baseband processing.

As shown in FIG. 5, in the storage section 27, a baseband processing program 271 is stored which is read out by the processing section 25 as a program and is executed in baseband processing (see FIG. 6). In addition, the baseband processing program 271 includes an acquisition program 2711 that is executed as an acquisition process (see FIG. 7) and an adequacy determining program 2713 that is executed as various acquisition adequacy determining processes (see FIGS. 3, 8, and 9) as sub routines.

The baseband processing is a process for calculating the position of the cellular phone 1, which is performed by the processing section 25, by performing a process of acquiring a GPS satellite signal transmitted from a GPS satellite and performing a predetermined position calculating process using the acquired GPS satellite signal.

In addition, the acquisition adequacy determining process is a process of determining the adequacy of the acquisition of a GPS satellite signal, which is performed by the satellite signal acquiring part 251, by using various determination methods described in the above-described principle. This process will be described in detail later with reference to a flowchart.

In the storage section 27, the collation satellite orbit data 272 for each satellite, the decoded satellite orbit data 274 for each satellite, and the measurement information 276 for each satellite are stored as data.

The collation satellite orbit data 272 for each satellite is data in which the collation satellite orbit data is stored for each satellite. In this example, the collation satellite orbit data relating to each satellite is externally acquired as assistance data through server assistance by communicating with the base station of the cellular phone 1 through the host processing unit 30.

The decoded satellite orbit data 274 for each satellite is data in which the satellite orbit data acquired by decoding the acquired GPS satellite signal is stored for each satellite.

The measurement information 276 for each satellite is data in which the measurement information relating to the acquired GPS satellite signal is stored for each satellite. In other words, for each acquisition target satellite, information of the reception frequency and the code phase is stored as the measurement information.

2-3. Flow of Processing

FIG. 6 is a flowchart showing the flow of the baseband processing performed by the baseband processing circuit unit 20 by reading out the baseband processing program 271 stored in the storage section 27 by using the processing section 25.

First, the satellite signal acquiring part 251 determines whether it is the first positioning after the input of power (Step A1). In a case where it is determined as the first positioning (Step A1; Yes), the satellite signal acquiring part 251 externally acquires the collation satellite orbit data 272 for each satellite as assistance data through server assistance by communicating with a base station and stores the acquired collation satellite orbit data for each satellite in the storage section 27 (Step A3).

After Step A3 or in a case where no first positioning is determined after the input of power in Step A1 (Step A1; No), the satellite signal acquiring part 251 performs the acquisition process according to the acquisition program 2711 stored in the storage section 27 (Step A5).

Figure 7:
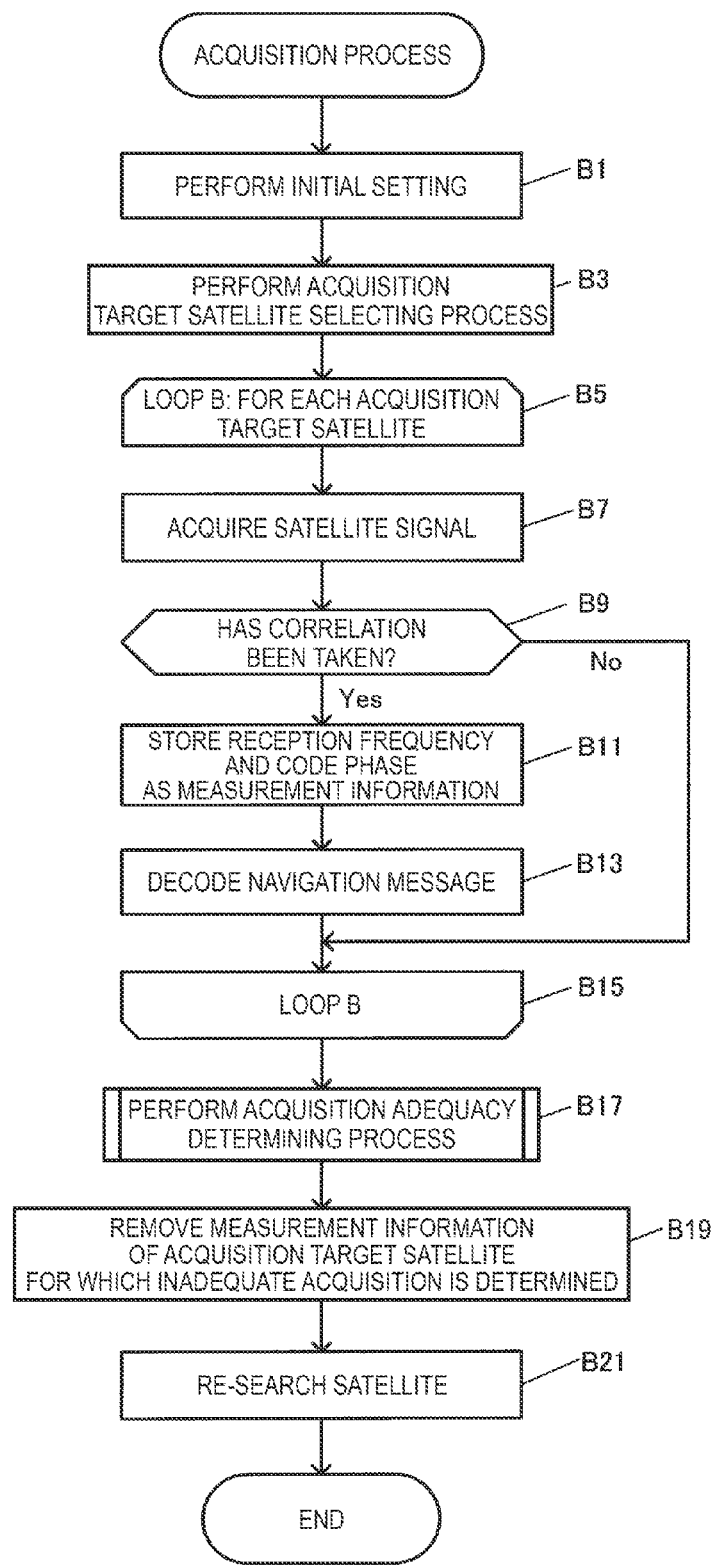
FIG. 7 is a flowchart showing an acquisition process.

FIG. 7 is a flowchart showing the acquisition process.

First, the satellite signal acquiring part 251 performs initial setting (Step B1). More specifically, the satellite signal acquiring part 251 sets a frequency search range of the GPS satellite signal. Described in detail, a range of a predetermined width (for example, ±10 kHz) with a specific search center frequency (for example, the defined carrier frequency after the intermediate frequency conversion) as its center is set as the frequency search range.

Next, the satellite signal acquiring part 251 performs an acquisition target satellite selecting process (Step B3). More specifically, at the measured time of the clock unit 90 (current time), a GPS satellite that is located at a given reference position in the sky is determined, for example, by using the collation satellite orbit data 272 for each satellite that is stored in the storage section 27 and is selected as an acquisition target satellite. For example, in the case of the first positioning after the input of power, the reference position is set as a position acquired from the assistance server through so-called server assistance, and, in the case of the second positioning and afterwards, the reference position can be set by using a method in which the reference position is set as the latest position that has been calculated or the like.

Thereafter, the satellite signal acquiring part 251 performs the process of loop B for each acquisition target satellite (Steps B5 to B15). In the process of loop B, the satellite signal acquiring part 251 acquires a GPS satellite signal by using a replica C/A code corresponding to a corresponding acquisition target satellite (Step B7).

More specifically, the satellite signal acquiring part 251 removes the carrier from the received carrier signal in the multiplication section 21 by allowing the carrier removing signal generating section 22 to generate a carrier removing signal while changing the search frequency within the frequency search range set in Step B1. In addition, the satellite signal acquiring part 251 allows the replica code generating section 24 to generate a replica C/A code of the acquisition target satellite and allows the correlation calculating section 23 to calculate a correlation while changing the amount of phase delay.

Next, the satellite signal acquiring part 251 determines whether or not a correlation has been taken (Step B9). In other words, in a case where a peak correlation value that is a maximum correlation value out of correlation values at various amounts of phase delay that are output from the correlation calculating section 23 exceeds a predetermined threshold value (or equal to or greater than the threshold value), it is determined that the correlation has been taken. In a case where it is determined that the correlation has not been taken (Step B9; No), the process proceeds to the next acquisition target satellite.

On the other hand, in a case where it is determined that the correlation has been taken (Step B9; Yes), the satellite signal acquiring part 251 stores the frequency (the reception frequency) of a carrier removing signal corresponding to the peak correlation value and the phase (the code phase) of the replica C/A code in the measurement information 276 for each satellite in the storage section 27 as the measurement information (Step B11).

Next, the satellite signal acquiring part 251 decodes the navigation message based on the correlation value output from the correlation calculating section 23 (Step B13). Then, the satellite signal acquiring part 251 allows the process to proceed to the next acquisition target satellite.

After the process of Steps B7 to B13 is performed for all the acquisition target satellites, the satellite signal acquiring part 251 ends the process of loop B (Step B15). Next, the satellite signal acquiring part 251 performs the acquisition adequacy determining process in accordance with the adequacy determining program 2713 stored in the storage section 27 (Step B17). For example, the satellite signal acquiring part 251 determines the adequacy of the acquisition of a GPS satellite signal transmitted from each acquisition target satellite by performing the first acquisition adequacy determining process shown in FIG. 3.

Next, the satellite signal acquiring part 251 deletes the measurement information of the acquisition target satellite that has been determined as inadequate acquisition in the acquisition adequacy determining process out of the measurement information 276, which is stored in the storage section 27, for each satellite (Step B19). The reason for this is for not using the measurement information of the satellite that has been determined as inadequate acquisition for position calculation.

Next, the satellite signal acquiring part 251 performs a re-search of a satellite (Step B21). More specifically, for the satellite determined as inadequate acquisition, the acquisition of a GPS satellite signal is performed again with the search range of the frequency changed. The reason for this is that, in a case where adequate acquisition is made by performing a re-search for the satellite determined as inadequate acquisition, the number of satellites that can be used for the position calculation increases, and accordingly, the performance of the position calculation can be enhanced. After performing such a process, the satellite signal acquiring part 251 ends the acquisition process.

In addition, before the re-search for a satellite is performed in Step B21, it may be determined whether or not the measurement information corresponding to the number of the satellites (hereinafter, referred to as "the number of satellites for enabling the position calculation) that are necessary for calculating the position or more is stored in the measurement information 276 for each satellite. Then, the re-search for a satellite, which is performed in Step B21, may be performed only in a case where the number of satellites for enabling position calculation has not been reached. For example, the number of satellites for enabling position calculation can be set as "3" in the case of two-dimensional positioning and be set as "4" in the case of three-dimensional positioning.

Returning to the baseband processing illustrated in FIG. 6, after the acquisition process is performed, the position calculating part 253 performs the position calculating process by using the measurement information for each acquired satellite that is stored in the measurement information 276 for each satellite and the navigation message that is decoded for each acquisition satellite (Step A7). In the position calculating process, by using a pseudo distance between the cellular phone 1 and each acquired satellite, the position of the cellular phone 1 is calculated, for example, by performing a known position calculating process using a least square method or a Kalman filter.

The pseudo distance can be calculated as follows. An integer part of the pseudo distance between each acquired satellite and the cellular phone 1 is calculated by using the satellite position of each acquired satellite and the initial position of the cellular phone 1 that are acquired from the navigation message. In addition, the fractional part of the pseudo distance between each acquired satellite and the cellular phone 1 is calculated by using the code phase included in the measurement information. By summing the integer part and the fractional part calculated as above, the pseudo distance is acquired.

Next, the position calculating part 253 outputs the position (position coordinates) calculated in the position calculating process to the host processing unit 30 (Step A9). Then, the processing section 25 determines whether or not the process is completed (Step A11). In a case where the process is determined not to be completed (Step A11; No), the process is returned to Step A1. On the other hand, in a case where the process is determined to be completed (Step A11; Yes), the baseband processing ends.

2-4. Operations and Advantages

In the baseband processing circuit unit 20, the processing section 25 determines the adequacy of the acquisition of a GPS satellite signal by using the decoded satellite orbit data (first satellite orbit data) acquired by decoding a GPS satellite signal acquired from the acquisition target satellite and the collation satellite orbit data (second satellite orbit data) externally acquired as assistance data for the acquisition target satellite. Since the collation satellite orbit data is satellite orbit data of the acquisition-desired satellite, in a case where the satellite orbit data acquired by decoding an acquired GPS satellite signal is data having the same content as that of the collation satellite orbit data, it can be determined that the acquisition of the GPS satellite signal is adequately performed.

According to the first determination method, the adequacy of the acquisition of a GPS satellite signal is determined based on a difference between the value of the satellite orbit parameter that is stored in the decoded satellite orbit data and the value of the satellite orbit parameter that is stored in the collation satellite orbit data. Described in detail, a plurality of approximation conditions, which are based on a difference between values of the satellite orbit parameters, is set, and the adequacy of the acquisition of a GPS satellite signal is determined based on whether or not a difference between the values of the satellite orbit parameters satisfies the approximation condition. At least an approximation condition that is based on a difference between mean anomalies at reference time "$M_0$" included in the satellite orbit parameters is set. In such a case, by performing a threshold value determination for at least the difference between the mean anomalies at reference time "$M_0$", it can be determined whether or not there is a cross correlation, and accordingly, the adequacy of the acquisition of a GPS satellite signal can be easily determined in a simple manner. In addition, by making a determination by combining a plurality of approximation conditions, a determination method that is robust for a decoding error or a lack of a bit value can be realized.

3. Modified Example

It is apparent that the example to which the invention can be applied is not limited to the above-described examples and can be appropriately changed in a range not departing from the concept of the invention. Hereinafter, although a modified example will be described, the same reference numeral is assigned to the same constituent element as that of the above-described example or the same processing steps illustrated in the flowcharts, and the description thereof will be omitted. Thus, parts different from those of the above-described example will be focused in the description.

3-1. Acquisition Adequacy Determining Process

Figure 8:
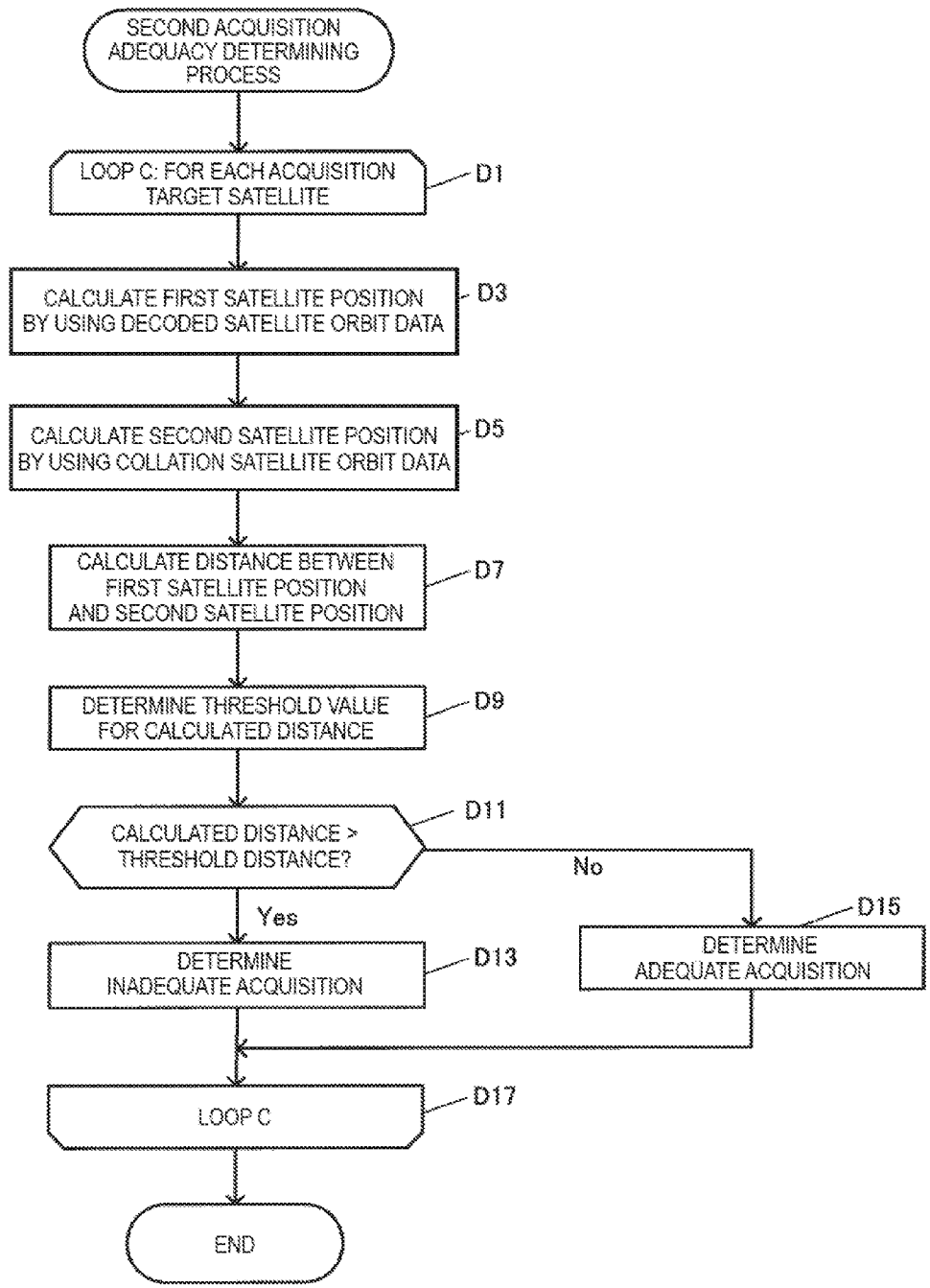
FIG. 8 is a flowchart showing the flow of a second acquisition adequacy determining process.

FIG. 8 is a flowchart showing the flow of a second acquisition adequacy determining process that replaces the first acquisition adequacy determining process illustrated in FIG. 3. The second acquisition adequacy determining process is a process using "1-2. Second Determination Method" as a single body.

The satellite signal acquiring part 251 performs the process of loop C for each acquisition target satellite (Steps D1 to D17). In the process of loop C, the satellite signal acquiring part 251 calculate the first satellite position of the acquisition target satellite by using the decoded satellite orbit data of the acquisition target satellite and the measured time of the clock unit 90 (Step D3). In addition, the second satellite position of the acquisition target satellite is calculated by using the collation satellite orbit data of the acquisition target satellite and the measured time of the clock unit 90 (Step D5).

Next, the satellite signal acquiring part 251 calculates a distance between the first satellite position and the second satellite position (Step D7). Then, the satellite signal acquiring part 251 performs a threshold value determining process based on the calculated distance (Step D9). In a case where the calculated distance exceeds a predetermined threshold distance (Step D11; Yes), the satellite signal acquiring part 251 determines acquisition inadequacy (Step D13), and the process proceeds to the next acquisition target satellite. On the other hand, in a case where the calculated distance is equal to or less than the predetermined threshold distance (Step D11; No), the satellite signal acquiring part 251 determines acquisition adequacy (Step D15), and the process proceeds to the next acquisition target satellite.

After the process of Steps D3 to D15 is performed for all the acquisition target satellites, the satellite signal acquiring part 251 ends the process of loop C (Step D17) and ends the second acquisition adequacy determining process.

3-2. Variation in Determination Method

Other than the two determination methods described in the above-described embodiment, for example, the adequacy of the acquisition of a GPS satellite signal can be determined by collating a data row of the decoded satellite orbit data and a data row of the collation satellite orbit data in units of one bit.

In a case where the type of each satellite orbit data is the same, and the satellite orbit data is data for the same satellite, in principle, the data row of the decoded satellite orbit data and the data row of the collation satellite orbit data are the same. Accordingly, by collating the data rows in units of one bit, the matching ratio increases. The matching ratio described here indicates the ratio of the number of bits of which the values match each other through the collation to the total number of bits as collation targets.

On the other hand, even in a case where the types of the satellite orbit data are different from each other, for the satellite orbit data of the same satellite, the values of the satellite orbit parameters are similar to each other. Accordingly, in data parts representing the values of the satellite orbit parameters, even the values of lower bits are different from each other, the values of upper bits are the same. Thus, for example, it may be configured such that the values of upper bits corresponding to a predetermined number out of data parts representing the values of the satellite orbit parameters are collated, and the adequacy of the acquisition of a GPS satellite signal is determined based on the result of the collation.

Here, a determination method that is based on a difference between the first satellite position and the second satellite position, which has been described as the second determination method, or a determination method that is based on the ratio of matching bits described above may be described as methods of determining whether the decoded satellite orbit data (the first satellite orbit data) and the collation satellite orbit data (the second satellite orbit data) are in the relation satisfying the approximation condition. Accordingly, it is apparent that such determination methods may be regarded as being included in the first determination method.

More specifically, for example, as shown in FIG. 10, in a table that defines approximation conditions, an approximation condition F is set in which a difference (a distance between satellite positions) between the first satellite position and the second satellite position is less than a predetermined threshold distance "$\theta_d$". In addition, an approximation condition G is set in which the matching ratio of bit values in a case where the decoded satellite orbit data and the collation satellite orbit data are collated in units of one bit exceeds a predetermined threshold value "$\theta_b$" [%].

Then, in the first acquisition adequacy determining process shown in FIG. 3, in the first approximation condition determining process (Step C3) and the second approximation determining process (Step C7), a determination is made by using an approximation condition selected from among a plurality of approximation conditions that include the approximation condition F and the approximation condition G. For example, a determination is made by using the approximation condition F in the first approximation condition determining process, and a determination is made using the approximation condition G in the second approximation determining process.

3-3. Method of Acquiring Collation Satellite Orbit Data

The collation satellite orbit data may be acquired by using an appropriate method other than the method in which the collation satellite orbit data is acquired from the base station of the cellular phone. For example, a configuration may be employed in which the collation satellite orbit data is downloaded by accessing a sever operated by a service provider that provides the collation satellite orbit data. In addition, a configuration may be employed in which a machine used for providing the collation satellite orbit data is installed at a cellular phone shop operated by a cellular phone carrier that provides a communication service for a cellular phone, and the collation satellite orbit data is acquired from the machine. Furthermore, in the case of the second positioning after the input of power and afterwards, the satellite orbit data acquired by decoding the GPS satellite signal in the past already exists, and accordingly, the decoded satellite orbit data may be used as the collation satellite orbit data.

3-4. Change in Determination Condition Based on Collation Satellite Orbit Data Depending on the method of acquiring the collation satellite orbit data, the collation satellite orbit data may be any one of the almanac, the long-term ephemeris, and the ephemeris. More specifically, in a case where the collation satellite orbit data is acquired from the base station of the cellular phone, it is presumed that the almanac or the ephemeris is provided as the collation satellite orbit data. On the other hand, in a case where the collation satellite orbit data is acquired from a service provider or a cellular phone carrier that provides the collation satellite orbit data, it is presumed that the long-term ephemeris generated by the service provider side is provided as the collation satellite orbit data. Furthermore, in a case where the decoded satellite orbit data acquired in the past is used as the collation satellite orbit data, it is presumed that the almanac is used as the collation satellite orbit data.

The prediction accuracy of the satellite orbit differs among the almanac, the long-term ephemeris, and the ephemeris. Generally, the prediction accuracy of the ephemeris tends to be the highest, the prediction accuracy of the long-term ephemeris tends to be the second highest, and the prediction accuracy of the almanac tends to be the lowest. Since the almanac is data of schematic satellite orbits of all the GPS satellites, the prediction accuracy thereof tends to be lower than that of the ephemeris or the long-term ephemeris. In addition, since the long-term ephemeris is data predicting the satellite orbit over a period longer than that of the ephemeris, it is presumed that the prediction accuracy thereof is presumed to be lower than that of the ephemeris.

As above, since the prediction accuracy of the satellite orbit differs depending on the type of the collation satellite orbit data, it is more effective to change the threshold value of the approximation condition in accordance with the type of the acquired satellite orbit data instead of fixing the threshold value of the approximation condition.

Figure 9:
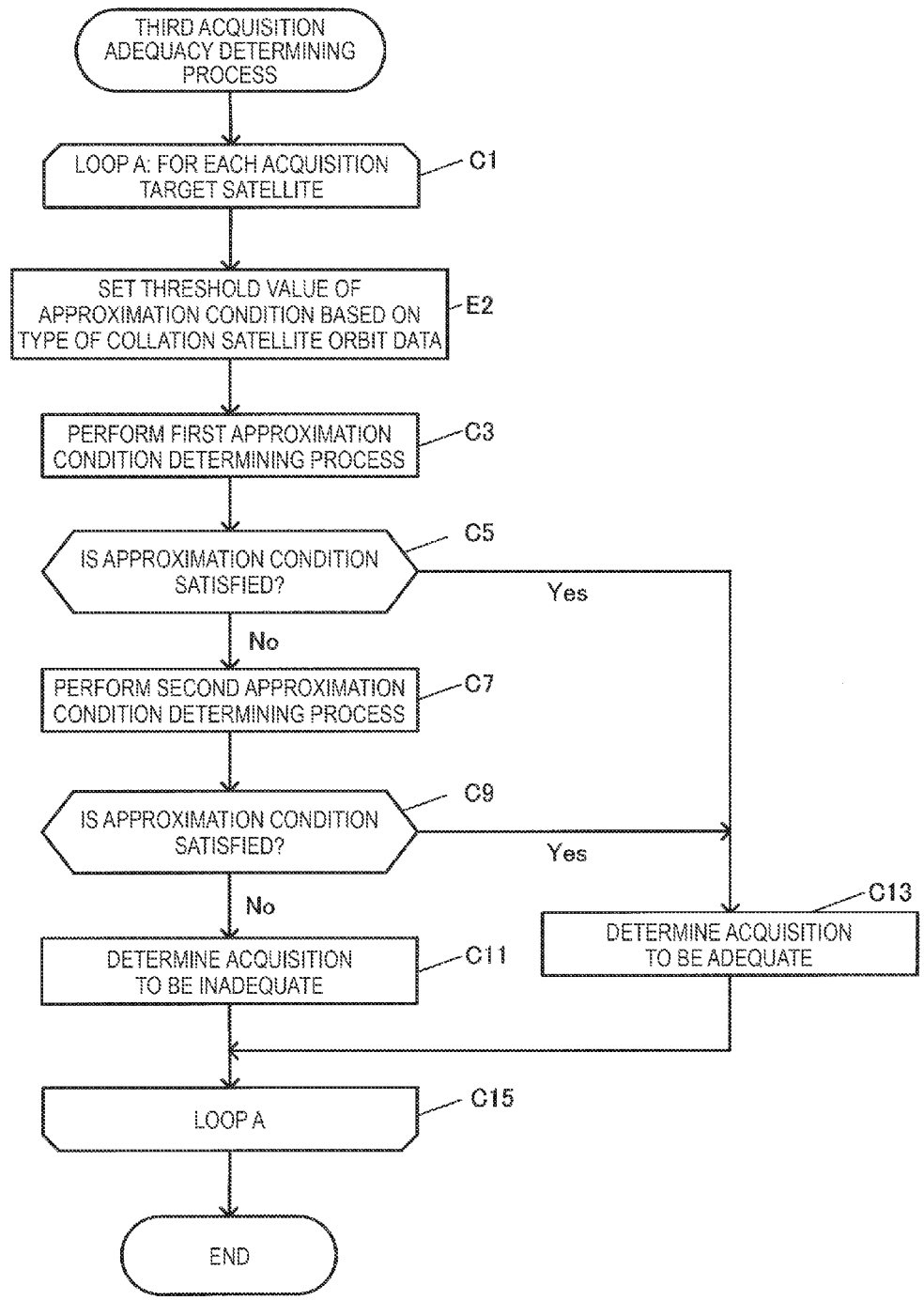
FIG. 9 is a flowchart showing the flow of a third acquisition adequacy determining process.

FIG. 9 is a flowchart showing the flow of a third acquisition adequacy determining process that is performed by the satellite signal acquiring part 251 in such a case instead of the first acquisition adequacy determining process illustrated in FIG. 3. Here, the same reference numeral is assigned to the same processing step as that of the first acquisition adequacy process, and the description thereof will be omitted.

In the third acquisition adequacy determining process, the satellite signal acquiring part 251 sets a threshold value of the approximation condition based on the type of the collation satellite orbit data of an acquisition target satellite that is stored in the storage section 27 in the process of loop A (Steps C1 to C15) performed for each acquisition target satellite (Step E2).

FIG. 11 is a diagram showing an example of the table configuration of an approximation condition threshold value table 278 as a table used for setting the threshold value of the approximation condition. In the approximation condition threshold value table 278, different threshold values are set for each approximation condition in accordance with the type of the collation satellite orbit data as anyone of the almanac, the long-term ephemeris, and the ephemeris.

For example, in the approximation condition A, as a threshold value "$\theta_p$ [%]" for the ratio of satellite orbit parameters of which values are close, "$\theta_p 1$ [%]" is set for the almanac, "$\theta_p 2$ [%]" is set for the long-term ephemeris, and "$\theta_p 3$ [%]" is set for the ephemeris. It is understood that the ratio of satellite orbit parameters of which values are close increases as the prediction accuracy of the collation satellite orbit data increases. Accordingly, the magnitude relationship among the threshold values is set as "$\theta_p 1 < \theta_p 2 < \theta_p 3$".

Similarly, for example, in the approximation condition C, as a threshold value "$\theta_M$" for a difference between the mean anomalies at reference time "$M_0$", "$\theta_M 1$" is set for the almanac, "$\theta_M 2$" is set for the long-term ephemeris, and "$\theta_M 3$" is set for the ephemeris. It is understood that the difference between the mean anomalies at reference time "$M_0$" decreases as the prediction accuracy of the collation satellite orbit data increases. Accordingly, the magnitude relationship among the threshold values are set as "$\theta_M 1 > \theta_M 2 > \theta_M 3$".

Similarly, for example, in the approximation condition F, as a threshold value "$\theta_d$" for a difference between the first satellite position and the second satellite position, "$\theta_d 1$" is set for the almanac, "$\theta_d 2$" is set for the long-term ephemeris, and "$\theta_d 3$" is set for the ephemeris. It is understood that the difference between the first satellite position and the second satellite position decreases as the prediction accuracy of the collation satellite orbit data increases. Accordingly, the magnitude relationship among the threshold values is set as "$\theta_d 1 > \theta_d 2 > \theta_d 3$".

Figure 12:
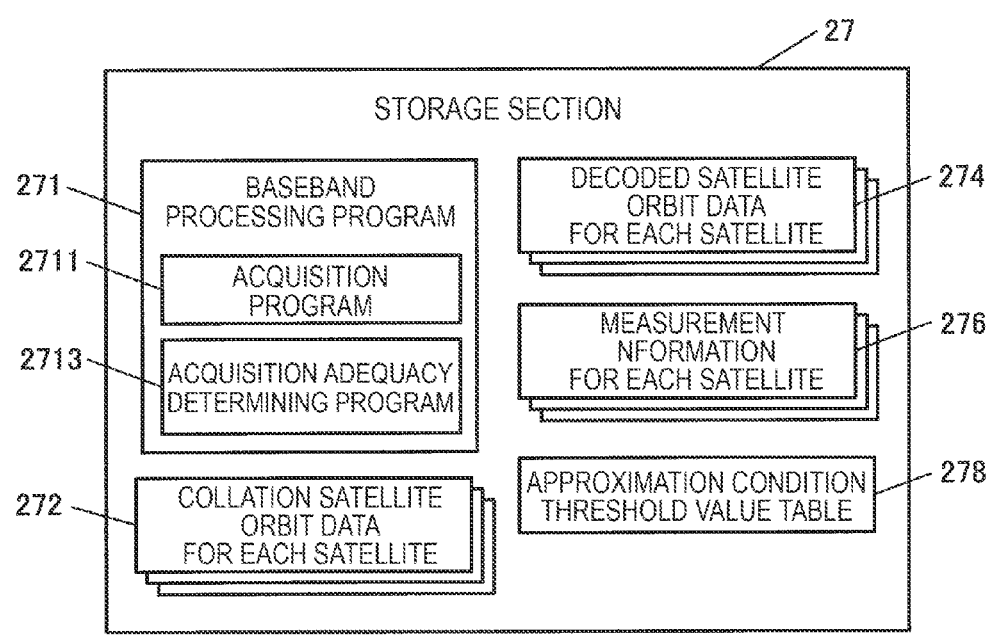
FIG. 12 is a diagram showing a modified example of the data configuration of a storage section of a baseband processing circuit unit.

In this case, for example, as shown in FIG. 12, the above-described approximation condition threshold value table 278 may be stored in the storage section 27 of the baseband processing circuit unit 20. Then, the satellite signal acquiring part 251 sets the threshold values of the approximation conditions used for determinations made in the first and second approximation condition determining processes by referring to the approximation condition threshold value table 278 stored in the storage section 27 in Step E2 of the third acquisition adequacy determining process illustrated in FIG. 9. Then, the first approximation condition determining process (Step C3) and the second approximation condition determining process (Step C7) are performed by using the set threshold values.

3-5. Electronic Apparatus

In the above-described example, although a case has been described as an example in which an embodiment of the invention is applied to a cellular phone as one type of electronic apparatus, the electronic apparatus to which an embodiment of the invention can be applied is not limited thereto. For example, an embodiment of the invention can be similarly applied to other electronic apparatuses such as a car navigation device, a mobile navigation device, a PC, a PDA (Personal Digital Assistant), and a wrist watch.

3-6. Subject of Processing

In the above-described example, although it has been described that an acquisition adequacy determination is made by the processing section of the baseband processing circuit unit, the host processing unit of the electronic apparatus may make the acquisition adequacy determination. In addition, the process may be shared such that the acquisition of a GPS satellite signal and the acquisition adequacy determination are performed by the processing section of the baseband processing circuit unit, and the position calculation is performed by the host processing unit of the electronic apparatus.

3-7. Satellite Positioning System

In the above-described embodiment, although a GPS has been described as an example of the satellite positioning system, any other satellite positioning system such as a WAAS (Wide Area Augmentation System), a QZSS (Quasi Zenith Satellite System), a GLONASS (GLObal NAvigation Satellite System), or a GALILEO may be used.

What is claimed is:

1. A method for improving accuracy of calculating a position of a receiver device, the method comprising:
   acquiring, by a receiver device, satellite orbit data of a first satellite;
   receiving, by the receiver device, a satellite signal and decoding the satellite signal to obtain decoded data assumed to be satellite orbit data by assuming the satellite signal originated from the first satellite;
   determining the adequacy of acquisition of the satellite signal by determining whether the received satellite signal originated from a second satellite instead of the first satellite using the decoded data assumed to be satellite orbit data and the acquired satellite orbit data of the first satellite that has been acquired, wherein the determining of the adequacy includes determining the adequacy of acquisition of the satellite signal based on a difference between a value assumed to be a satellite orbit parameter that is stored in the decoded data and a value of a satellite orbit parameter that is stored in the acquired satellite orbit data;
   calculating a position of the receiver device based on the determination of the adequacy of acquisition of the satellite signal; and
   outputting the calculated position of the receiver device.

2. The method according to claim 1, wherein the determining of the adequacy includes determining the adequacy of acquisition of the satellite signal based on at least a difference between a satellite position designation value included in the satellite orbit parameter that is stored in the decoded data and a satellite position designation value included in the satellite orbit parameter that is stored in the acquired satellite orbit data.

3. The method according to claim 1,
   wherein the determining of the adequacy includes:
   calculating a first satellite position by using the decoded data;
   calculating a second satellite position by using the acquired satellite orbit data; and
   determining the adequacy of acquisition of the satellite signal based on a difference between the first satellite position and the second satellite position.

4. The method according to claim 1,
   wherein the decoded data is assumed to be ephemeris, and
   wherein the acquired satellite orbit data is any one of almanac, long-term ephemeris, and ephemeris.

5. The method according to claim 4, further comprising changing a determination condition of the adequacy of the acquisition based on whether the acquired satellite orbit data is any one of the almanac, the long-term ephemeris, and the ephemeris.

6. The method according to claim 1, wherein the acquired satellite orbit data is assistance data acquired through server assistance.

7. An adequacy determining device comprising:
   a baseband processing circuit that acquires satellite orbit data of a first satellite,
   decodes the satellite signal to obtain decoded data assumed to be satellite orbit data by assuming the satellite signal originated from the first satellite, determines an adequacy of acquisition of the satellite signal by determining whether the received satellite signal originated from a second satellite instead of the first satellite using the decoded data assumed to be satellite orbit data and the acquired satellite orbit data of the first satellite that has been acquired, based on at least a difference between a value assumed to be a satellite orbit parameter that is stored in the decoded data and a value of a satellite orbit parameter that is stored in the acquired satellite orbit data, calculates a position of a receiver device based on the determined adequacy of acquisition of a satellite signal received by the receiver device, and outputs the calculated position of the receiver device.

\* \* \* \* \*